(12) United States Patent
Kemppinen (10) Patent No.: US 7,199,313 B1
(45) Date of Patent: Apr. 3, 2007

(54) ELECTRONIC DEVICE HAVING FULL FUNCTION FOLDABLE KEYBOARD

(75) Inventor: Pasi Kemppinen, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/388,867

(22) Filed: Mar. 23, 2006

(51) Int. Cl.
*G06F 1/16* (2006.01)

(52) U.S. Cl. .................... 200/5 A; 361/680; 455/575.1

(58) Field of Classification Search ............... 200/5 A, 200/5 R, 18, 333; 341/20, 22; 345/156, 345/168, 169, 172, 173; 361/680, 681; 400/472, 400/473, 489; 455/560, 575.1, 575.3
See application file for complete search history.

(56) References Cited

U.S. PATENT DOCUMENTS

| | | | |
|---|---|---|---|
| 6,836,404 B2 * | 12/2004 | Duarte .................... | 361/680 |
| 6,983,175 B2 * | 1/2006 | Kwon ..................... | 455/575.1 |
| 6,989,984 B2 * | 1/2006 | Sutton et al. ............... | 361/680 |
| 7,031,143 B2 * | 4/2006 | Madsen et al. ............. | 361/680 |
| 7,035,089 B2 * | 4/2006 | Chuang .................... | 361/680 |
| 7,050,767 B2 * | 5/2006 | Hickey et al. ............. | 455/90.3 |

OTHER PUBLICATIONS

U.S. Appl. No. 11/100,832, filed Apr. 7, 2005, "Mobile Communication Terminal".

* cited by examiner

*Primary Examiner*—Michael A. Friedhofer
(74) *Attorney, Agent, or Firm*—Ware, Fressola, Van Der Sluys & Adolphson LLP (57) ABSTRACT

A full function foldable keyboard for an electronic device and in particular a mobile communication terminal having first, second and third body elements is disclosed wherein hinged together second and third body elements are arranged for pivotal movement relative to one another about a lengthwise axis passing through the hinge as the device is moved between its operative closed and open positions. The second body element is arranged for rotational movement with respect to the first body element about a pivot axis passing lengthwise through the first and second body elements and is offset from one edge of the first body element and the hinge edge of the second body element. The third body element moves with transverse sliding movement along an angular linear path with respect to the first body element as the device is moved between its operative closed and open positions. A communication keyboard is accessible for usage in the closed operative position and a full function keyboard is exposed and accessible for usage in the open operative position. A display is constructed in the first body element.

12 Claims, 7 Drawing Sheets

ELECTRONIC DEVICE HAVING FULL FUNCTION FOLDABLE KEYBOARD

TECHNICAL FIELD

The present invention relates generally to electronic devices and more particularly with portable hand held electronic devices operating in multiple applications and having keyboard functionality. The present invention more specifically deals with a full function foldable keyboard for an electronic device and in particular, a mobile communication terminal.

BACKGROUND OF THE INVENTION

Portable electronic devices particularly mobile telephones and similar mobile communication devices have rapidly expanded in use and function as users have demanded increasing functionality. It is common to see mobile telephones that provide Global Computer Network access, messaging, personal information management, personal digital assistant functionality, music, facsimile and gaming, in addition to telephone communication functionality. More complex keyboards have been provided to be compatible with the more complex applications that are found in such devices.

Figure 1:
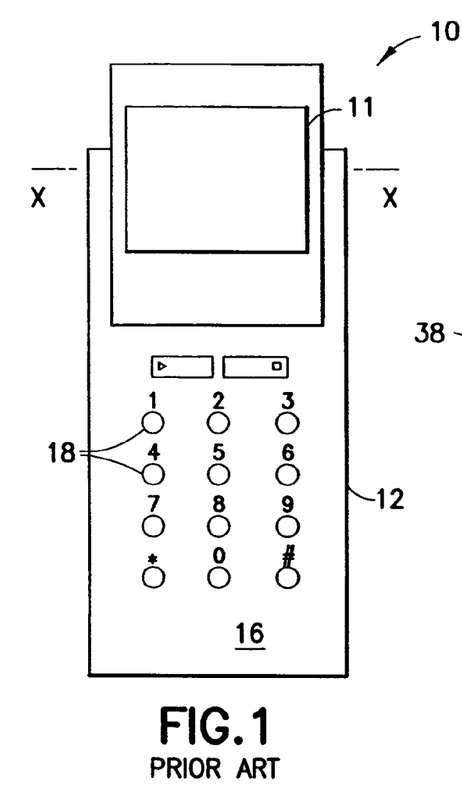
FIG. 1 is a schematic diagram of a prior art electronic device with a foldable keyboard in a closed position.
Figure 2:
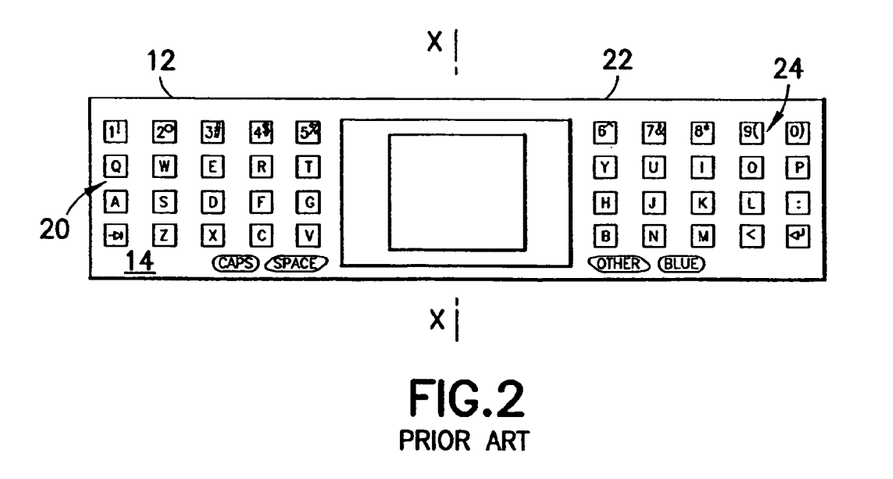
FIG. 2 is a schematic diagram of the prior art electronic device of FIG. 1 in an open position showing the portions of the foldable keyboard revealed for access.

One such prior art full function keyboard arrangement is disclosed in U.S. Pat. No. 6,580,932, assigned to the same assignee as the present invention and is shown in FIGS. 1 and 2. A foldable keyboard is provided in a mobile phone 10 having a display screen 11 wherein a panel 12 has an inner face 14 and an outer face 16 and rotates about the pivot axis X—X between two operative positions. The outer face 16 carries a communication keypad 18 and the inner face 14 carries a portion 20 of the number of keys of the full function keyboard and which keys are exposed for access and usage when the panel 12 is rotated into an open position as shown in FIG. 2. The panel 12 is in an overlapping position with a further fixed panel 22 that carries the remaining portion 24 of the number of keys of the keyboard. The keys on the fixed panel 22 are exposed for access and usage when the rotated panel 12 is in the open position. Although such devices are capable of providing more complex applications, the arrangement limits the size of the keys and the key array of the full function keyboard and increases the size of the device in the open position.

It would be desirable therefore to provide a key array for a full function keyboard in an electronic device while maintaining the compact size demanded for the electronic device.

Also, prior art electronic devices having foldable function keyboards such as disclosed in U.S. Pat. No. 6,580,932, require complex control circuitry to change the orientation of the display between portrait and landscape when the device is rotated to accommodate the unfolded keyboard.

It would be desirable therefore to provide an electronic device with a foldable function keyboard wherein the display screen retains its orientation with the keyboard folded and unfolded.

Figure 3:
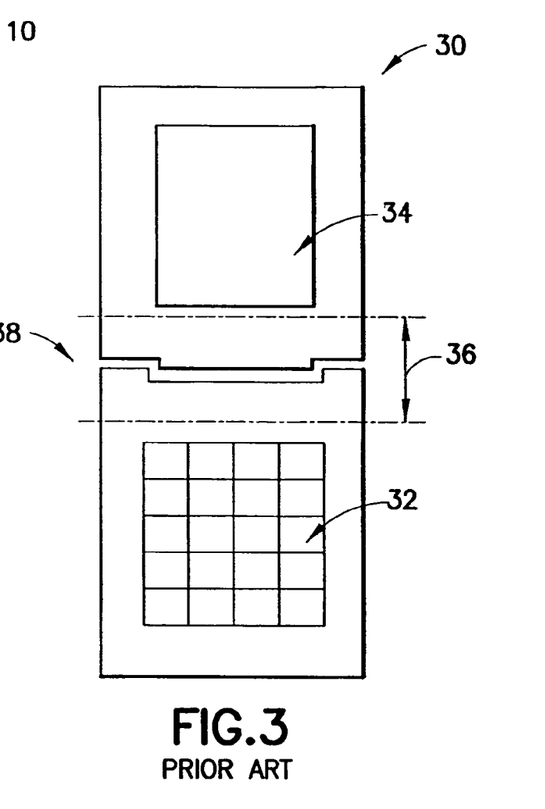
FIG. 3 is a schematic diagram of a prior art electronic hinged device in an open position showing the unused surface area of the two-hinged parts in the region of the hinge.

Further, prior art foldable or hinged electronic devices such as a mobile phone 30 illustrated in FIG. 3 also limit the size of a keyboard 32 and display screen 34 to accommodate the hinge 38. Although such hinged arrangements for electronic devices reduce the size of the electronic device compared to non-foldable electronic devices, the area 36 in the region of the hinge 38 is otherwise wasted and unused.

It would be desirable therefore to utilize the otherwise unusable surface area in a hinged electronic device to provide a foldable function keyboard for the electronic device.

It is not unreasonable to expect that further applications and functionalities will be added to portable electronic devices and mobile communication terminals.

It is an object of the present invention therefore to provide a full function keyboard such as a QWERTY keyboard in an electronic device for example a mobile communication terminal, to accommodate the more complex applications of the electronic device while maintaining a compact form factor for the electronic device.

SUMMARY OF THE INVENTION

In accordance with a broad aspect of the invention, an electronic device is presented and includes first, second and third body elements. The first body element has a first major surface relative to usage and an oppositely disposed second major surface. The second body element has a third major surface relative to usage and an oppositely disposed fourth major surface relative to usage. The third body element has a fifth major surface relative to usage and an oppositely disposed sixth major surface. The first and third major surfaces are accessible by a user in an operative closed position, and the first, fourth and fifth major surfaces are accessible by a user in an open operative position.

A hinge connects the second and third body elements to one another for pivotal movement relative to one another about an axis passing lengthwise through the hinge as the electronic device is moved between its operative closed and open positions.

The second body element is arranged for rotational movement with respect to the first body element about a pivot axis passing lengthwise through the first and second body elements. The pivot axis is offset inwardly a predetermined distance from one edge of the first body element and the hinge edge of the second body element. The hinge moves laterally along an accurate path as the electronic device is moved between its operative closed and open positions.

The third body element is arranged for transverse sliding movement along an angular linear path with respect to the first body element as the electronic device is moved between its operative closed and open positions such that a plane coincident with the third body element fifth major surface and parallel with the first body element first major surface moves from a positional orientation below the first body element first major surface to a positional orientation such that the third body element fifth major surface lies in the same plane as the first body element first major surface and the second body element fourth major surface.

The third body element may have the same as or a larger thickness than the second body element. A groove defining the angular linear path is formed in an end edge surface in the third body element and adjacent a facing end edge surface of the first body element. A pin extends lengthwise from the facing end edge surface of the first main body element and is received in the groove. The groove extends in an angular direction generally away from the fifth major surface such that the pin is closest to the fifth major surface when the electronic device is in its closed operative position and is furthest away from the fifth major surface when the electronic device is in its open operative position.

In a further aspect of the invention, an electronic device is presented and includes first, second and third body elements. A hinge connects the second and third body elements to one another. The second and third body elements are foldable along an axis passing lengthwise through the hinge. A first operative closed position is defined by the second and third body elements being folded together and in their folded arrangement have a width substantially the same as the width of the first body element. A second operative open position is defined by the second and third body elements being in an unfolded orientation. The unfolded width of the hinged together second and third body elements is larger than the width of the first body element. The second body element is connected to the first body element and is arranged for rotational movement about a pivot axis passing lengthwise through the first body element and the second body element. The pivot axis is offset on the second body element a first predetermined distance from the hinge axis. The third body element is connected to the first body element and is arranged for transverse sliding engagement along an angular linear path with respect to the first body element whereby unfolding the second and third body elements causes the respective major surfaces of the second and third body elements to be accessible and substantially in one plane, and parallel to the major surface of the first body element.

In another aspect of the invention, a mobile communication terminal is presented and includes: a first body element having a first major surface relative to usage and an oppositely disposed second major surface; a screen constructed in the first major surface of the first body element to provide a visible display of information to the user; a second body element having a third major surface relative to usage and an oppositely disposed fourth major surface relative to usage, and a third body element having a fifth major surface relative to usage and an oppositely disposed sixth major surface. A hinge connects the second and third body elements to one another. The second and third body elements are foldable between open and closed operative positions along an axis passing lengthwise through the hinge. The second body element third major surface is accessible to the user in the closed position. The second body element fourth major surface and the third body element fifth major surface are accessible to the user in the open operative position. The second and third body elements are in an overlapping alignment with one another in the closed operative position.

A communication keypad is constructed in the third surface of the second body element. The communication keypad is exposed for operative use in the closed operative position and is located below the screen.

A function keyboard is constructed in two portions with a first portion constructed in the second body element fourth major surface and a second portion constructed in the third body element fifth major surface. Each of the function keyboard portions has an array of keys consistent with a desired function. The function keyboard is exposed for operative use in the open operative position wherein the second and third body elements are in side-by-side non-overlapping alignment with one another and located below said screen. The function keyboard is inaccessible in the closed operative position wherein the second and third body elements are in fourth major surface to fifth major surface facing overlapping alignment with one another, and the communication keypad is exposed and accessible by the user.

The second body element is connected to the first body element and is arranged for rotational movement about a pivot axis passing lengthwise through the first body element and the second body element. The pivot axis is offset on the second body element a first predetermined distance from the hinge axis. The third body element is connected to the first body element and is arranged for transverse sliding engagement with the first body element along an angular linear path whereby the plane of the third body element fifth major surface moves from an orientation below the plane of the first body element first major surface to an orientation substantially even with the plane of the first body element first major surface.

The function keyboard maybe arranged as a QWERTY keyboard with approximately one-half of the keyboard carried on the second body element fourth major surface and the remaining one-half of the keyboard carried on the third body element fifth major surface. The function keyboard maybe any desired keyboard such as a French AZERTY keyboard or a German GWERTZ(U) keyboard.

BRIEF DESCRIPTION OF THE DRAWINGS

Other objects, features and advantages of the present invention will become readily apparent from the written description taken in conjunction with the drawings wherein.

WRITTEN DESCRIPTION OF PREFERRED EMBODIMENTS

Figure 4:
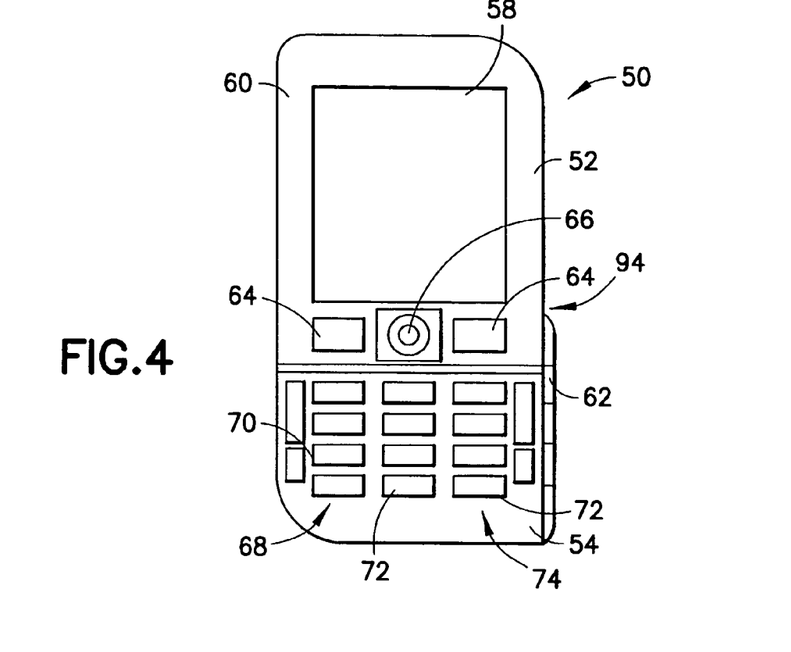
FIG. 4 is a front plan view of an electronic device having a foldable function keyboard embodying the present invention in the closed operative position.
Figure 5:
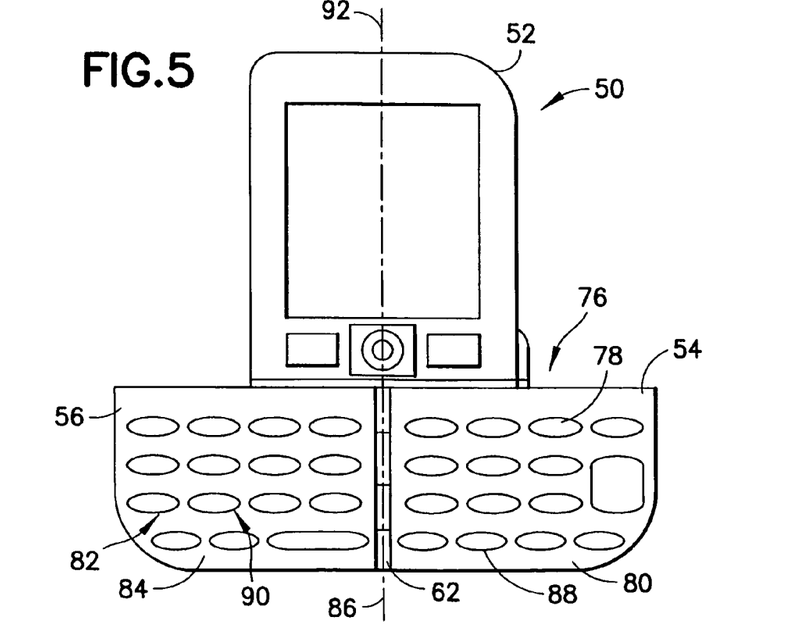
FIG. 5 is a front plan view of the electronic device shown in FIG. 1 in an open operative position.

Turning now to the drawings and considering the invention in further detail, a mobile communication terminal embodying the present invention is illustrated with particular reference to FIGS. 4 and 5 and generally designated 50. The mobile communication terminal 50 includes a first body element 52, a second body element 54 and third body element 56. The first body element 52 has a first major surface 60 relative to usage and an oppositely disposed second major surface (not shown). A screen 58 is constructed in the first major surface 60 of the first body element 52 to provide a visible display of information to the user in a well known and understood manner. Function keys 64, 64 also known as soft keys, and a navigational button 66 is constructed in the first body element first major surface 60 and operate in a well known and understood manner. The second body element 54 has a third major surface 74 relative to usage and an oppositely disposed fourth major surface 80 relative to usage. The third body element 56 has a fifth major surface 84 relative to usage and an oppositely disposed sixth major surface (not shown in FIGS. 4 and 5).

A hinge generally designated 62 connects the second body element 54 and the third body element 56 to one another. The second and third body elements 54, 56 respectively are foldable between an open operative position as illustrated in FIG. 5 and a closed operative position as illustrated in FIG. 4 along an axis 86 passing lengthwise through the hinge 62. As illustrated in FIG. 4, the second body element third major surface 74 is accessible to the user in the closed operative position. As illustrated in FIG. 5, the second body element fourth major surface 80 and the third body element fifth major surface 84 are accessible to the user in the open operative position. The second and third body elements 54, 56 are folded together in an overlapping alignment with one another in the closed operative position with the fourth major surface 80 in a facing relationship with the fifth major surface 84.

A communication keypad generally designated 68 is constructed in the third major surface 74 of the second body element 54 and is exposed for operative use in the closed operative position. The communication keypad 68 is located below the screen 58 thus the mobile communication terminal 50 is operated in a portrait orientation.

A function keyboard generally designated 76 is constructed in two portions with a first portion 78 constructed in the second body element fourth major surface 80 and a second portion 82 constructed in the third body element fifth major surface 84. Each of the function keyboard portions 78, 82 has an array of keys 88, 90, respectively arranged consistent with a desired function. The function keyboard 76 is exposed for operative use in the open operative position wherein the second and third body elements 54, 56 respectively are in a side-by-side, non-overlapping alignment with one another and located below the screen 58 thus the display is maintained in a portrait orientation during operation of the keys of the keyboard. As illustrated in FIG. 5, the unfolded side-by-side second and third body elements 54, 56 are wider than the width of the first body element 52 thereby providing a larger area to carry the keys of the function keyboard 76 so that larger spaced apart keys may be used thus making operation of the keyboard easier for the user.

As explained in further detail below, when the second and third body elements 54, 56 are unfolded as shown in FIG. 5, the positional location of the hinge 62 is such that hinge axis 86 is coincident with the longitudinal center line 92 of the mobile communication device 50. It is seen that the hinge 62 moves from its positional location along one side 94 of the mobile communication terminal to the center thus the first and second portions 78, 82 of the function keyboard 76 are symmetrical about the longitudinal center line 92 of the mobile communication terminal. The function keyboard 76 is inaccessible in the closed operative position as illustrated in FIG. 4. The function keyboard 76 may be arranged as a QWERTY keyboard with approximately one half of the keyboard carried on the second body element fourth major surface 80 and the remaining one half of the keyboard carried on the third body element fifth major surface 84. The function keyboard may be any desired keyboard such as French keyboard AZERTY keyboard or a German GWERTZ(U) keyboard or may be arranged as a gaming keyboard if the mobile communication device is arranged with gaming capability and functionality.

Figure 6:
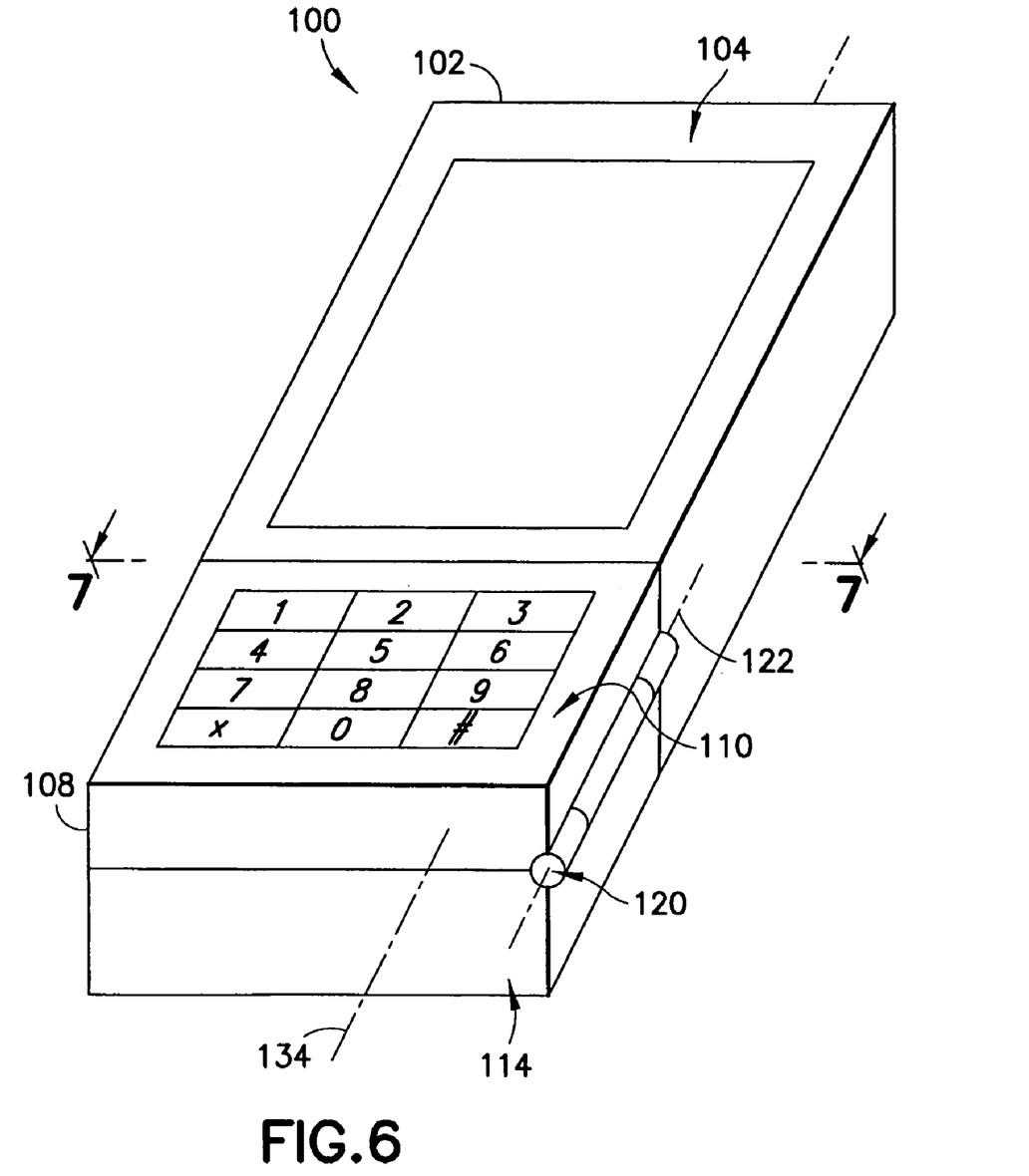
FIG. 6 is a schematic perspective view of an electronic device embodying the invention showing the function keyboard in its folded position.
Figure 7:
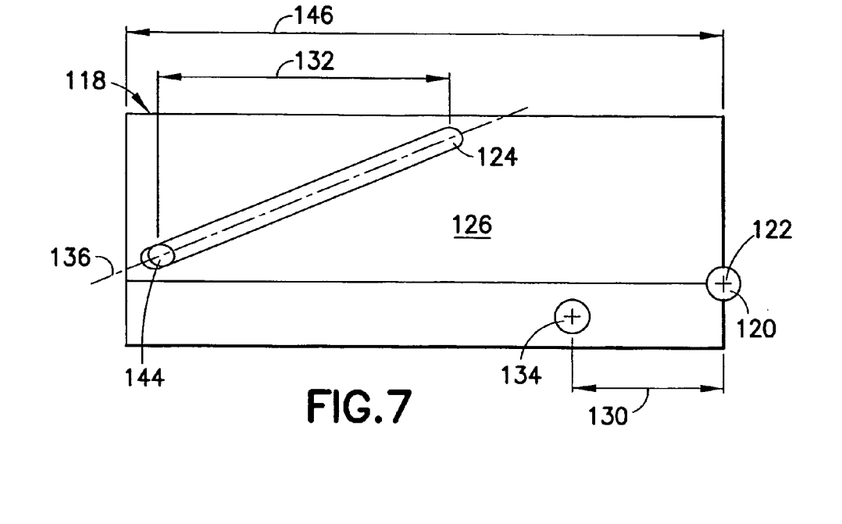
FIG. 7 is a cross section view taken along the line 7—7 of FIG. 6 showing the upper face surface edges of the function keyboard body elements in the closed, folded position.
Figure 8:
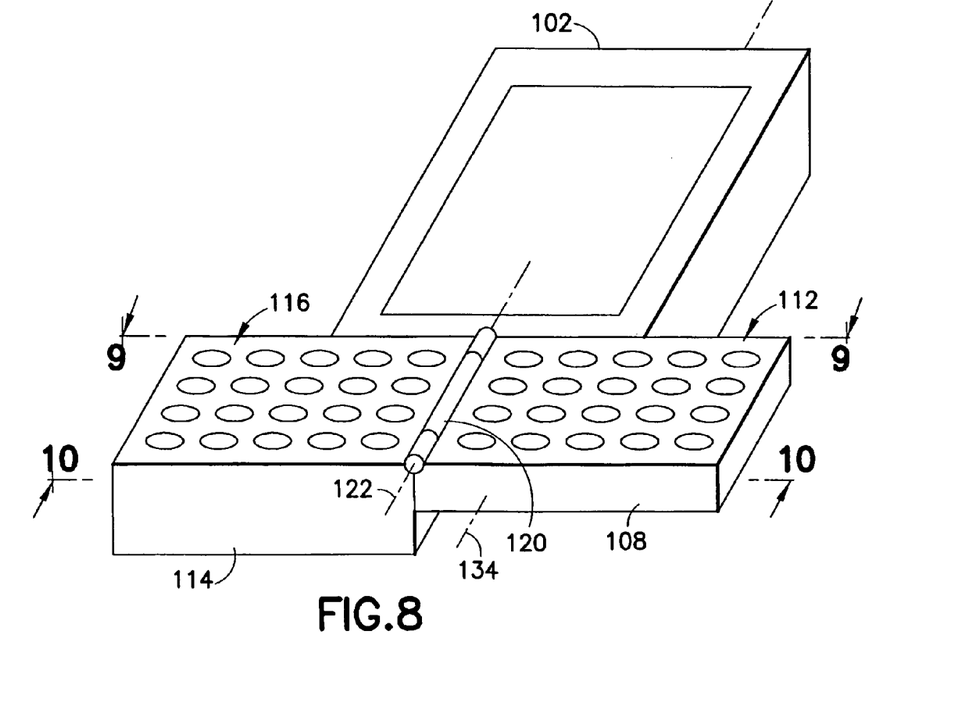
FIG. 8 is a schematic perspective view of an electronic device embodying the invention showing the function keyboard in its unfolded open operative position.
Figure 9:
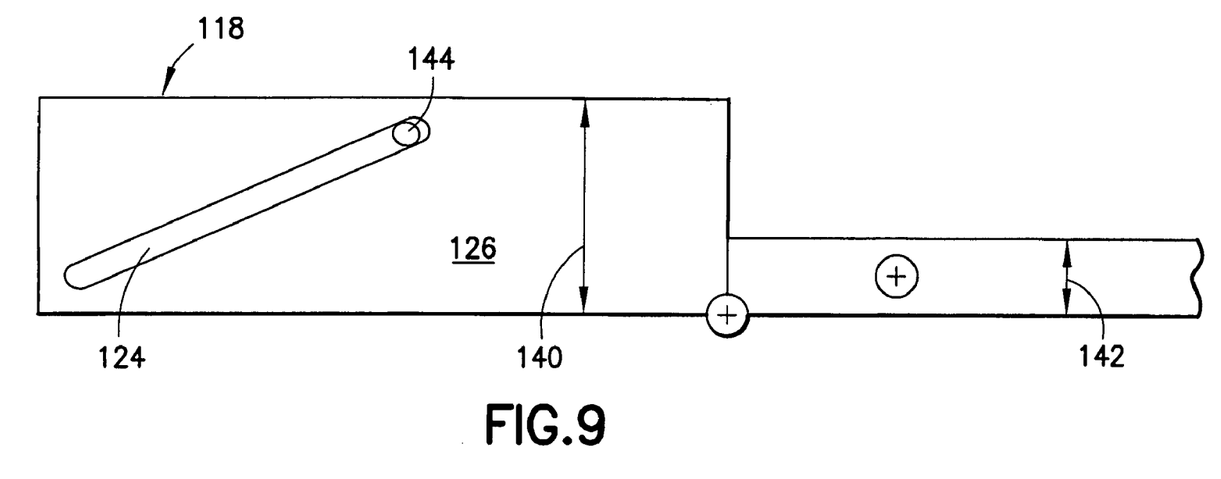
FIG. 9 is a cross section view taken along the line 9—9 of FIG. 8 showing the upper face surface edges of the function keyboard body elements in the open, unfolded position.

The connection and arrangement of the first, second and third body elements 52, 54 and 56, respectively is now described with particular reference to FIGS. 6–12 wherein an electronic device generally designated 100 is illustrated therein. The electronic device 100 includes first body element 102 having a first major surface 104 relative to usage and an oppositely disposed second major surface 106 relative to usage; a second body element 108 having a third major surface 110 relative to usage and an oppositely disposed fourth major surface 112 relative to usage; and a third body element 114 having a fifth major surface 116 relative to usage and an oppositely disposed surface 118 relative to usage. The first and third major surfaces 104, 110 respectively are accessible by a user an operative closed position as illustrated in FIG. 6 and the fourth and fifth major surfaces 112, 116 are accessible by a user in an open operative position as illustrated in FIG. 8.

A hinge 120 connects the second and third body elements 108, 114 to one another for pivotal movement relative to one another about a hinge axis 122 passing lengthwise through the hinge 120 as the electronic device is moved between its operative open and closed positions.

The second body element 108 is arranged for rotational movement with respect the first body element 102 about a pivot axis 134 passing lengthwise through the first body element 102 and the second body element 108. The pivot axis 134 is offset on the second body element 108 a first predetermined distance 130 from the hinge axis 122 as best shown in FIG. 7. The distance 130 is approximately equal to one quarter of the width 146 of the third body element 114.

Figure 10:
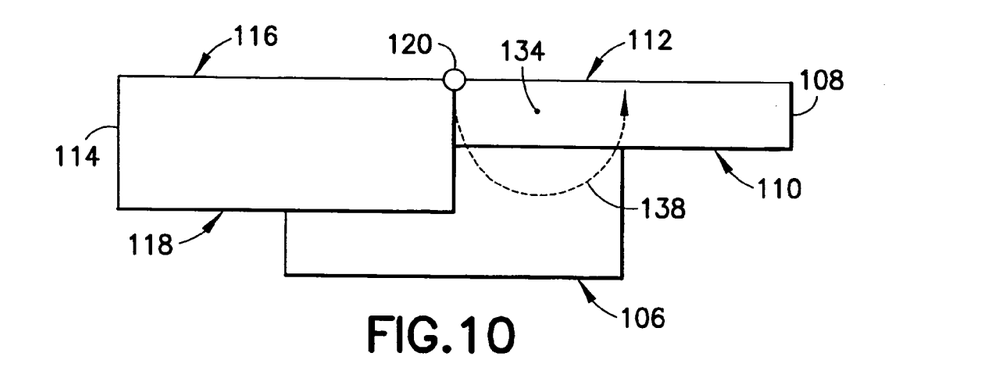
FIG. 10 is a cross section view taken along the line 10—10 of FIG. 8 showing the bottom face surface edges of the function keyboard and first body elements.
Figure 11:
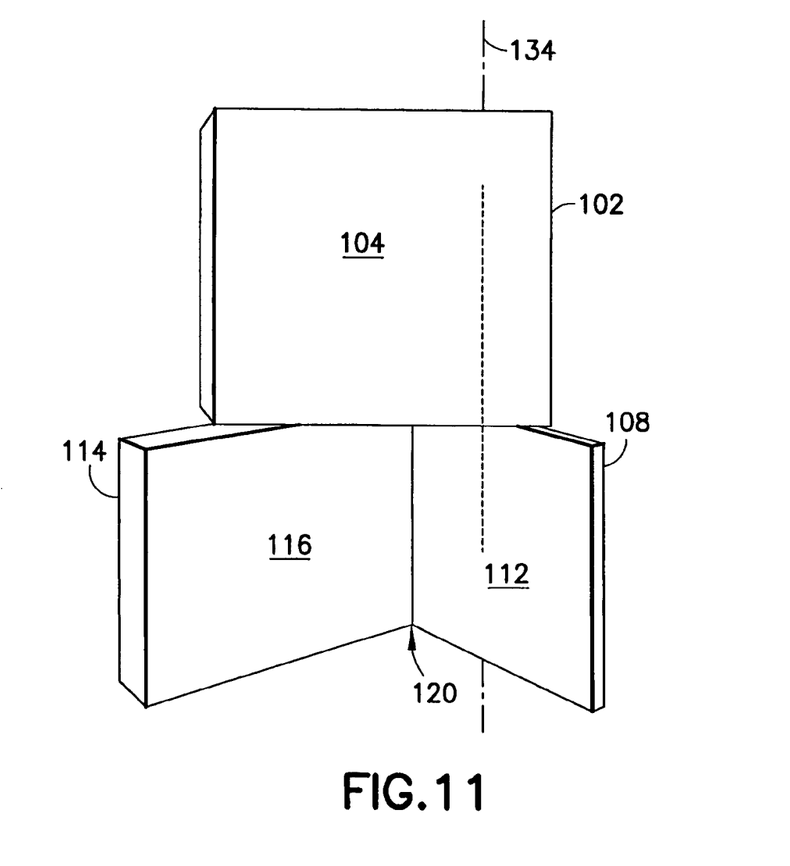
FIG. 11 is a schematic somewhat perspective view of an electronic device embodying the present invention showing the function keyboard body elements in a partially unfolded position intermediate the open and closed operative positions of the electronic device.
Figure 12:
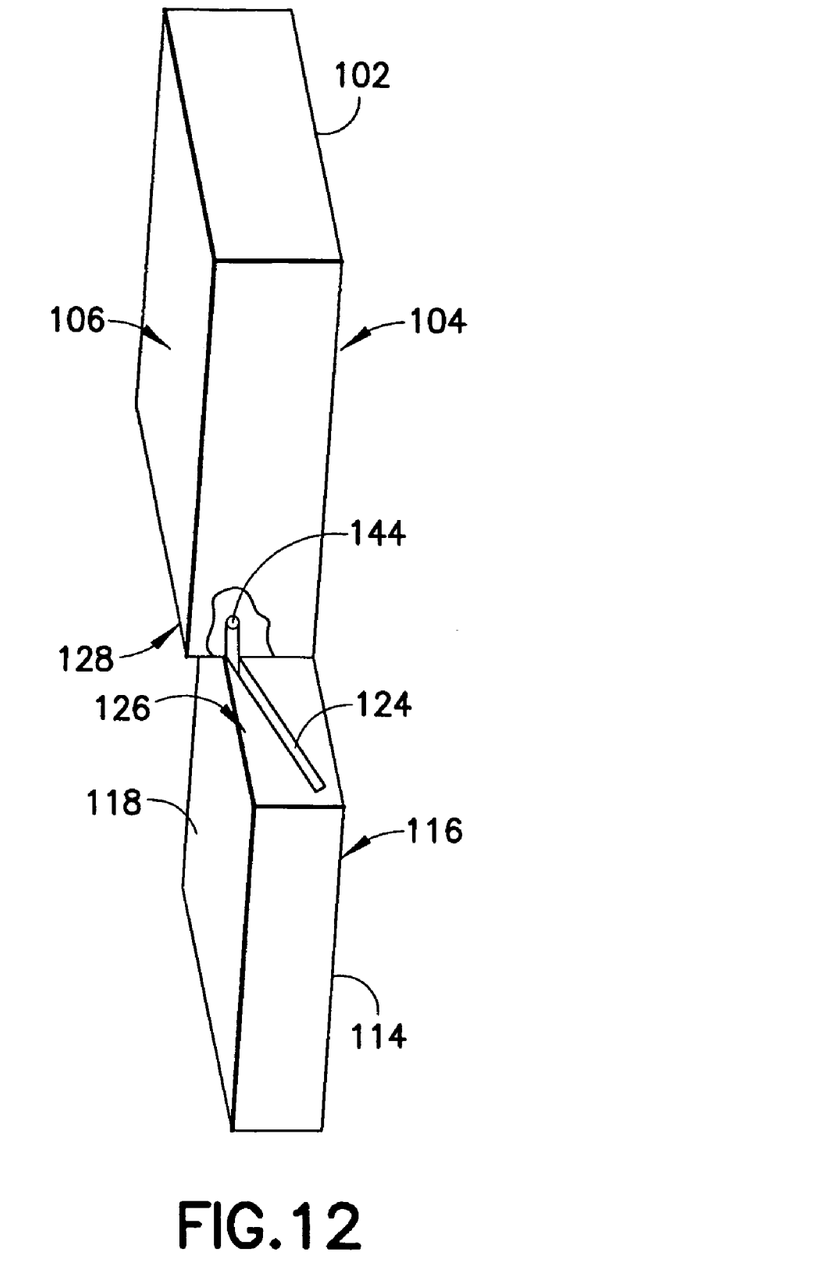
FIG. 12 is a schematic side perspective view of an electronic device embodying the invention in an open operative position showing the groove in the upper face surface edge of the third body element.

The third body element 114 is connected to the first body element 102 and is arranged for transverse sliding engagement along an angular linear path generally designated 136 with respect to the first body element 102. The second and third body elements 108, 114 move with a compound, articulated sliding motion whereby unfolding the second and third body elements causes the respective major surfaces 112, 116 of the second and third body elements 108, 114 respectively to be accessible and substantially in one plane and parallel to and in the plane of the first major surface 104 of the first body element 102. It will be seen that the hinge 120 moves transversely laterally along an arcuate path generally designated 138 as best shown in FIG. 10 as the electronic device 100 is moved between its operative open and closed positions.

The third body element 114 may have substantially the same thickness or a larger thickness 140 than the thickness 142 of the second body element 108 (a larger thickness is shown in the drawing figures). A groove 124 is formed in an end edge surface 126 in the third body element 114 and adjacent a facing end edge surface 128 of the first body element 102 and defines the angular linear path 136. A pin 144 extends lengthwise from the facing end edge surface 128 of the first body element 102 and is received and retained in the groove 124. The groove 124 extends in angular direction generally away from the fifth major surface 116 such that the pin 144 is closest to the fifth major surface 116 when the electronic device 100 is in its closed operative position and is furthest away from the fifth major surface 116 when the electronic device 100 is in its open operative position. The length end-to-end 132 of the groove 124 is equal to approximately one half of the width 146 of the third body element 114.

A full function foldable keyboard for an electronic device and in particular a mobile communication terminal has been presented above in several embodiments to provide a key array for a full function keyboard in the electronic device while maintaining the compact size demanded for the electronic device and wherein the display screen retains its orientation with respect to the keyboard in its folded and unfolded orientations and also in utilizing the otherwise unusable surface area in a hinged electronic device.

The invention claimed is:

1. Electronic device, comprising:
a first body element configured with a first major surface relative to usage and an oppositely disposed second major surface;
a second body element configured with a third major surface relative to usage and an oppositely disposed fourth major surface relative to usage;
a third body element configured with a fifth major surface relative to usage and an oppositely disposed sixth major surface, and
a hinge arranged for connecting said second and third body elements to one another for pivotal movement relative to one another about an axis passing lengthwise through said hinge as the electronic device is moved between an operative closed position and an open operative position such that said first major surface and said third major surface are accessible in said operative closed position, and said first major surface and said fourth and fifth major surfaces are accessible by a user in said open operative position.

2. The electronic device as defined in claim 1 further comprising said second body element further being arranged for rotational movement with respect to said first body element about a pivot axis passing lengthwise through said first and second body elements, said pivot axis being offset inwardly a predetermined distance from one edge of said first body element and the hinge edge of said second body element such that said hinge moves laterally along an accurate path as the electronic device is moved between said operative closed position and said open operative position.

3. The electronic device as defined in claim 2 further comprising said third body element further being arranged for transverse sliding movement along an angular linear path with respect to said first body element between said operative closed and open positions such that a plane coincident with said third body element fifth major surface and parallel with said first body element first major surface is arranged for movement from a positional orientation below said first body element first major surface to a positional orientation such that said third body element fifth major surface lies in the same plane as said first body element first major surface and said second body element fourth major surface.

4. The electronic device as defined in claim 3 further comprising said third body element further configured with a thickness substantially equal to or larger than the thickness of said second body element.

5. The electronic device as defined in claim 4 further comprising:

said third body element configured with a groove formed in an end edge surface of said third body element adjacent an end edge surface and defining said angular linear path;
said first body element further configured with a pin extending lengthwise from said end edge surface of said first main body element and received in said groove;
said groove further extending in an angular direction generally away from said fifth major surface such that said pin is closest to said fifth major surface when the electronic device is in said closed operative position and is furthest away from said fifth major surface when the electronic device is in said open operative position.

6. Electronic device, comprising:
a first body element;
a second body element;
a third body element;
a hinge;
said second and third body elements hingedly connected to one another and foldable along an axis passing lengthwise through said hinge;
a first operative closed position defined by said hinged together second and third body elements being folded together and having a width substantially the same as said first body element;
a second operative open position defined by said second and third body elements being in an unfolded orientation and having an unfolded width larger than the width of said first body element;
said second body element being connected to said first body element and arranged rotational movement about a pivot axis passing lengthwise through said first body element and said second body element and offset on said second body element a first predetermined distance from said hinge axis;
said third body element being connected to said first body element and arranged for transverse sliding engagement along an angular linear path with respect to said first body element such that unfolding said second and third body elements causes respective major surfaces of said second and third body elements to be accessible and substantially in one plane, and parallel to a major surface of said first body element.

7. A mobile communication device terminal, comprising:
a first body element configured with a first major surface relative to usage and an oppositely disposed second major surface;
a screen constructed in said first major surface of said first body element for providing a visible display of information to the user;
a second body element configured with a third major surface relative to usage and an oppositely disposed fourth major surface relative to usage;
a third body element configured with a fifth major surface relative to usage and an oppositely disposed sixth major surface;
a hinge;
said second and third body elements hingedly connected to one another and foldable between open and closed operative positions along an axis passing lengthwise through said hinge such that said second body element third major surface is accessible in said closed operative position and said second body element fourth major surface and said third body element fifth major surface are accessible in said open operative position;

said second and third body elements further being configured for overlapping alignment with one another in said closed operative position;

a communication keypad constructed on said third surface of said second body element and located below said screen such that said keypad is exposed for operative use in said closed operative position;

a function keyboard constructed in two portions, a first portion constructed in said second body element fourth major surface and a second portion constructed in said third body element fifth major surface, each of said function keyboard portions having an array of keys consistent with a desired function;

said function keyboard is located below said screen and is exposed for operative use in said open operative position wherein said second and third body elements are further configured for side-by-side non-overlapping alignment with one another;

said function keyboard is inaccessible in said closed operative position in which said second and third body elements are further configured in a fourth major surface to fifth major surface facing overlapping alignment, and said communication keypad is exposed and accessible;

said second body element further being configured for to said first body element and arranged for rotational movement about a pivot axis passing lengthwise through said first body element and said second body element, said pivot axis being arranged offset on said second body element a first predetermined distance from said hinge axis;

said third body element further being configured for connection to said first body element and arranged for transverse sliding engagement with respect to said first body element along an angular linear path such that the plane of said third body element fifth major surface is arranged for movement from a positional orientation located below the plane of said first body element first major surface in said closed operative position to a positional orientation substantially even with the plane of said first body element first major surface such that the third body element fifth major surface lies in the same plane as said first body element first major surface and said second body element fourth major surface in said open operative position.

8. The mobile communication terminal as defined in claim 7 wherein said function keyboard further comprises a QWERTY keyboard arranged with approximately one-half of said keyboard carried on said second body element fourth major surface and the remaining one-half of said keyboard carried on said third body element fifth major surface.

9. The mobile communication terminal as defined in claim 7 wherein said function keyboard further comprises a French AZERTY keyboard.

10. The mobile communication terminal as defined in claim 7 wherein said function keyboard further comprises a German GWERTZ(U) keyboard.

11. An apparatus, comprising:

a hinge means, for connecting a second body element and a third body element to one another for pivotal movement relative to one another about an axis passing lengthwise through said hinge means, in response to folding between an operative closed position and operative open position;

a pivot means, for connecting a first body element and said second body element for rotation about a pivot axis passing lengthwise through said first body element and said second body element and offset a predetermined distance from said hinge axis, in response to folding of said second and third body elements between said operative closed and open positions;

an engagement means, for connecting said first body element and said third body element for transverse sliding movement along an angular linear path with respect to said first body element, in response to folding of said second and third body elements between said operative closed and open positions, such that major surfaces of said first, second and third body elements in said operative open position lie in the same plane.

12. Apparatus, as defined in claim 11 further comprising a keyboard means, for providing a keyboard function from an array of keys arranged in accordance with the intended function with approximately one half carried on said second body element and one half carried on said third body element and accessible in response to unfolding said second and third body elements to said operative open position.

* * * * *